US008083316B2

(12) United States Patent
LaBar et al.

(10) Patent No.: US 8,083,316 B2
(45) Date of Patent: Dec. 27, 2011

(54) PRINTHEAD CARRIER WITH HEIGHT-ADJUSTABLE BEARING MECHANISM FOR CONTINUOUS ADJUSTMENT OF THE PRINTHEAD CARRIER POSITION

(75) Inventors: Daniel Robert LaBar, Lexington, KY (US); Serena Nicole Oaks, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 620 days.

(21) Appl. No.: 12/215,847

(22) Filed: Jun. 30, 2008

(65) Prior Publication Data

US 2009/0322825 A1 Dec. 31, 2009

(51) Int. Cl.
*B41J 23/00* (2006.01)
*B41J 11/20* (2006.01)
*F16C 29/12* (2006.01)

(52) U.S. Cl. ................................ 347/37; 384/40; 400/59

(58) Field of Classification Search .................... 347/37; 384/38, 39, 40; 400/59
See application file for complete search history.

(56) References Cited

U.S. PATENT DOCUMENTS

| | | | | | |
|---|---|---|---|---|---|
| 703,924 | A * | 7/1902 | Holt | | 384/40 |
| 4,573,747 | A * | 3/1986 | Frazee | | 384/40 |
| 5,227,809 | A * | 7/1993 | Carpenter et al. | | 400/56 |
| 5,988,784 | A * | 11/1999 | Takemura et al. | | 347/37 |
| 6,250,731 | B1 * | 6/2001 | Hashimoto | | 347/37 |
| 6,616,354 | B2 * | 9/2003 | O'Hara et al. | | 400/56 |
| 6,663,302 | B2 * | 12/2003 | Kelley et al. | | 347/8 |
| 6,666,537 | B1 * | 12/2003 | Kelley et al. | | 347/8 |

* cited by examiner

*Primary Examiner* — Shelby Fidler

(57) ABSTRACT

A printhead carrier includes a body having spaced apart bearings by means of which the body is supported at a predetermined position in the printer adapted to position a printhead on the printhead carrier at a placement relative to a path of a sheet of print media through a print zone in the printer, and a height-adjustable mechanism associated with one of the bearings that is continuously adjustable to effect a continuous increase or decrease of the height of the one bearing relative to the body to thereby set the printhead at a proper angle relative to the sheet of print media.

15 Claims, 6 Drawing Sheets

PRINTHEAD CARRIER WITH HEIGHT-ADJUSTABLE BEARING MECHANISM FOR CONTINUOUS ADJUSTMENT OF THE PRINTHEAD CARRIER POSITION

BACKGROUND

1. Field of the Invention

The present invention relates generally to proper locating of a printhead relative to a print media path in a printer and, more particularly, to a printhead carrier with a height-adjustable bearing mechanism for effecting continuous adjustment of the printhead carrier position to set the proper angle of the printhead relative to a sheet of print media.

2. Description of the Related Art

A conventional inkjet printer includes a frame which defines a print media path along which a sheet of print media is transported through a print zone in the printer. A printhead carrier assembly supported on the frame of the printer includes a printhead carrier adapted to undergo reciprocating movement relative to a carrier frame and across the print media path for carrying and scanning at least one printhead through the print zone. As the printhead traverses the print zone it ejects drops of ink onto the sheet of print media at predefined locations to form a printed image thereon that is expected to be a high-quality replica of image data inputted to the printer for printing. The achievement of a high-quality printed image is dependent, at least in part, on the proper alignment of the printhead carrier relative to the carrier frame to provide the desired gap between the printhead and the sheet of print media. If the printhead carrier is not properly aligned and positioned relative to the carrier frame, the printhead will then not be properly spaced relative to the sheet of print media in the print zone and, as a consequence, the expected high quality of the image printed will be not be attained.

U.S. Pat. Nos. 6,386,681 and 6,692,107, assigned to the same assignee as the present invention, recognize the need to properly align and position the inkjet printhead with the sheet of print media to produce a high-quality replica of the input image data. In the printers disclosed in these patents a printhead carrier is aligned with and supported by a carrier frame in the printer at locations of primary and secondary bearings defined on the carrier. At its primary and secondary bearings, the carrier slidably rides on two guide members of the carrier frame in the form of elongate rods or rails spaced apart from one another. The primary and secondary bearings are formed at locations on the carrier that are preselected for properly aligning the printhead relative to the sheet of print media and also for enabling the carrier to be translated by a suitable translation mechanism bi-directionally along an axis defined by the guide members across the width of the sheet of print media. The translation mechanism may include a belt attached to the carrier and a drive motor coupled to the belt to drive the belt and thereby translate the printhead carrier along the guide members.

More particularly, there are two primary bearings and one secondary bearing defined on the carrier where it rests on the two guide members. The two primary bearings are spaced apart from each other and formed on the carrier adjacent the respective opposite ends thereof. The primary bearings each contact one guide member on a top guiding surface thereof and at two locations thereon. The one secondary bearing is aligned between the two primary bearings, laterally offset both vertically and horizontally from them, and located above them. The secondary bearing is integrally formed by a unitary structure that contacts the other guide member on a top guiding surface thereof and thus at one location thereon.

Other printers are known that employ similar primary and secondary bearings. In many higher-end products, however, the secondary bearing is not integral but actually an additional part fastened onto the carrier. By making the secondary bearing an additional part, the bearing material can be optimized for better wear and a longer life of the carrier. Additionally, in some printers this additional part forming the secondary bearing is made adjustable to change the angular relationship of the printhead carrier to the guide members. However, this additional secondary bearing part has only limited capability in that it can only be used to make a few rough, discrete adjustments which fall short of being able to set the proper angular relationship of the printhead carrier to the guide members.

SUMMARY OF THE INVENTION

The present invention meets this need by providing an innovation that can effect continuous, not just discrete, adjustment of the position of a printhead carrier on guide members and thereby set the proper angle of the printhead relative to a sheet of print media in the print zone.

Accordingly, in an aspect of the present invention, a printhead carrier in a printer includes a body having spaced apart bearings by means of which the body is supported at a position in the printer adapted to position a printhead on the printhead carrier at a predetermined placement relative to a path of a sheet of print media through a print zone in the printer, and a height-adjustable mechanism associated with at least one of the bearings and continuously adjustable to effect a continuous increase or decrease of the height of the one bearing relative to the body to thereby set the printhead at a proper angle relative to the sheet of print media.

In another aspect of the present invention, the height-adjustable mechanism includes a stationary portion, an adjustable portion and a fastener. The stationary portion is rigidly attached on the carrier body and has a first ramp and a boss adjacent the first ramp defining a fastener-receiving bore. The adjustable portion has an upper bearing surface constituting the one bearing of the carrier body and a second ramp spaced below the upper bearing surface and complementary in shape to the first ramp of the stationary portion such that the second ramp overlies and rests upon the first ramp enabling continuous sliding movement of the adjustable portion uphill or downhill relative to the stationary portion to correspondingly continuously increase or decrease the height of the upper bearing surface above the stationary portion and thereby correspondingly change the angular position of the carrier body in the printer. The adjustable portion further has a slot spaced from the second ramp and extending generally parallel thereto with opposing ends defining limits of the range of the continuous sliding movement of the adjustable portion relative to the stationary portion. The fastener is insertable through the slot of the adjustable portion and into the fastener-receiving bore of the boss of the stationary portion to releasably fasten the adjustable portion to the stationary portion to thereby retain the upper bearing surface of the adjustable portion at a desired height above the stationary portion and the body at a desired angular position in the printer.

In another aspect of the present invention, a printhead carrier assembly in a printer includes a carrier frame having a first guide member and a second guide member spaced apart and laterally offset, both vertically and horizontally, from and located above the first guide member, a printhead carrier having a body and primary and secondary bearings supporting the body on the first and second guide members so as to position a printhead on the printhead carrier at a predetermined placement relative to a path of a sheet of print media through a print zone in the printer, and a height-adjustable mechanism associated with the secondary bearing and being continuously adjustable to effect a continuous increase or decrease of the height of the secondary bearing above the body to thereby set the printhead at a proper angle relative to the sheet of print media.

BRIEF DESCRIPTION OF THE DRAWINGS

Figure 1:
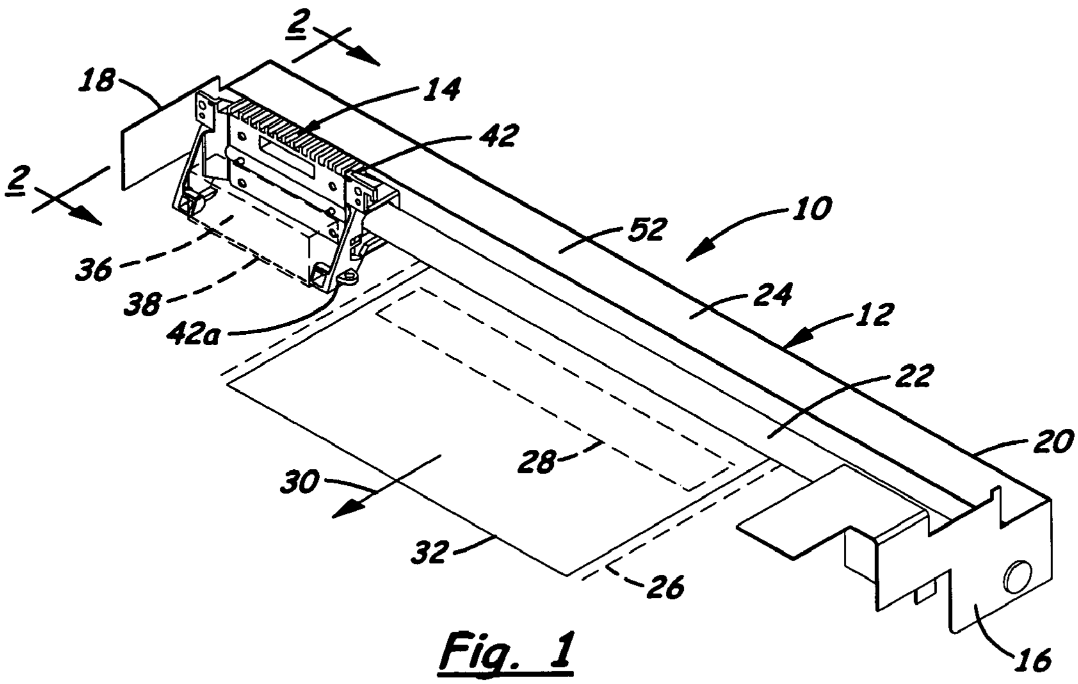

Having thus described the invention in general terms, reference will now be made to the accompanying drawings, which are not necessarily drawn to scale, and wherein:

FIG. 1 is a perspective view of a printhead carrier assembly of a printer incorporating a height-adjustable bearing mechanism (hidden from view by portions of the carrier support frame) in accordance with the present invention.

Figure 2:
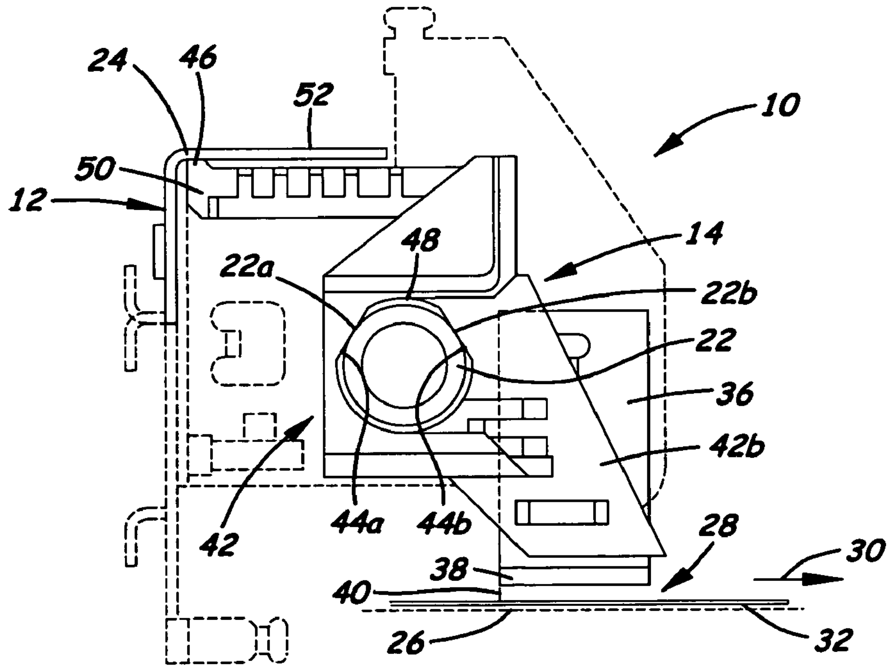

FIG. 2 is an enlarged end view of the carrier assembly as seen along line 2-2 of FIG. 1, showing one portion of an end panel of a carrier frame broken away and other portions of the end panel in dashed outline form, leaving only the portion of the carrier frame located adjacent a printhead carrier shown in solid line form.

Figure 3:
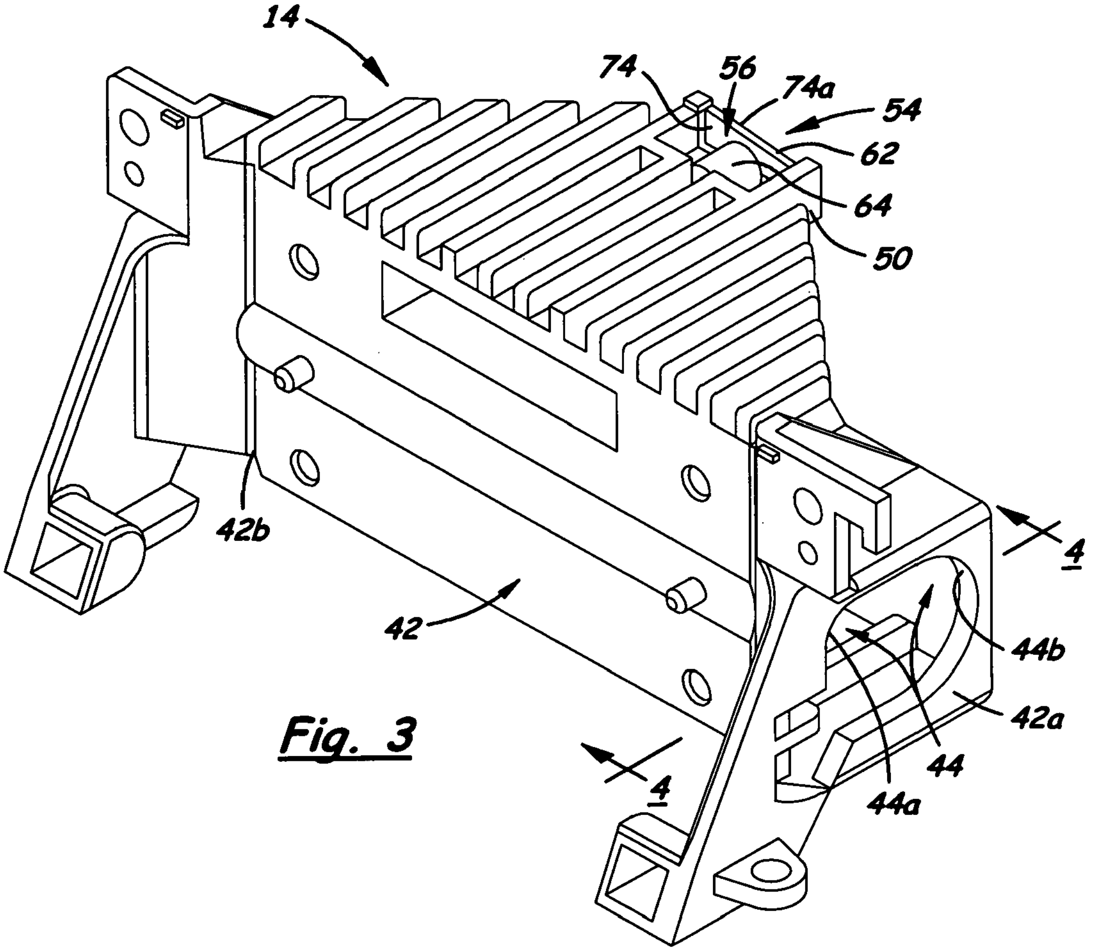

FIG. 3 is an enlarged front perspective view of the printhead carrier of FIGS. 1 and 2 by itself showing a stationary component of one embodiment of the height-adjustable mechanism of the present invention incorporated on a rear portion of the printhead carrier.

Figure 4:
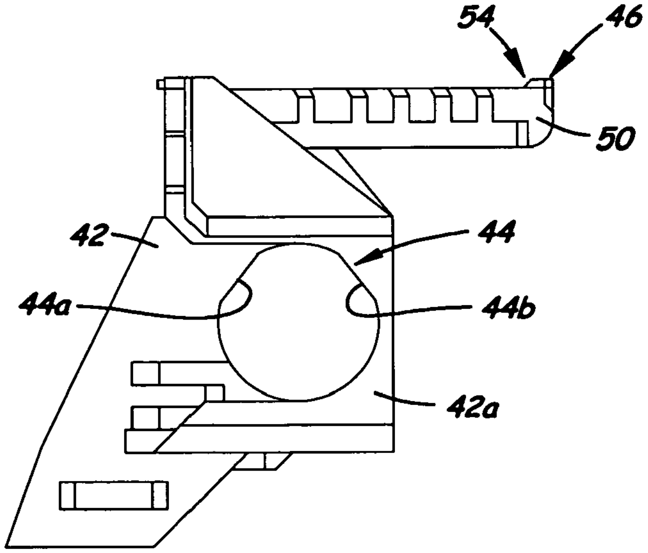

FIG. 4 is a side elevational view, on a reduced scale, of the printhead carrier as seen along line 4-4 of FIG. 3.

Figure 5:
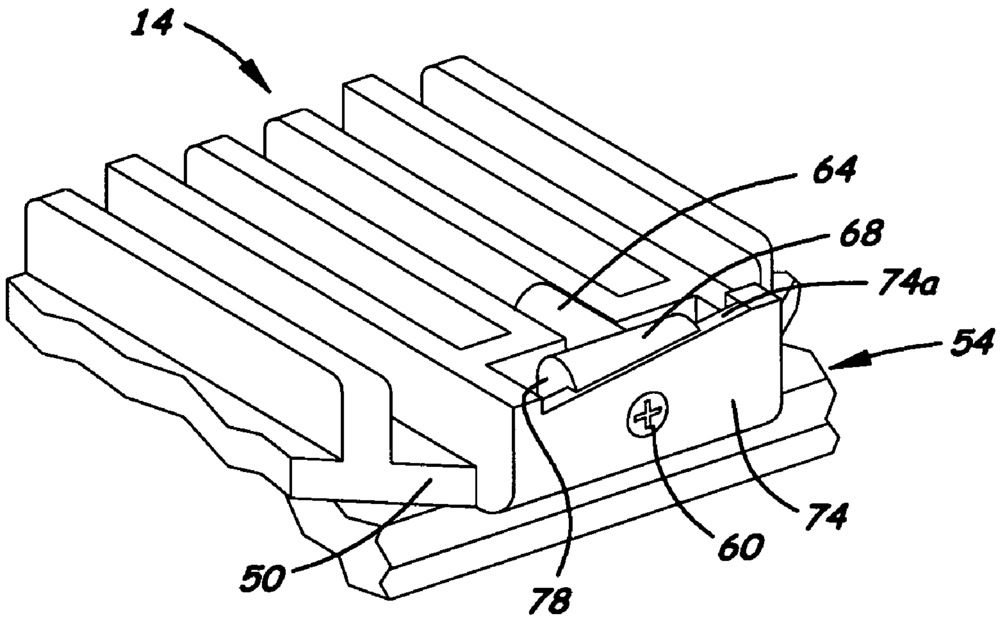

FIG. 5 is a rear perspective fragmentary view of the printhead carrier of FIG. 3, showing the one embodiment of the height-adjustable mechanism of the present invention.

Figure 6:
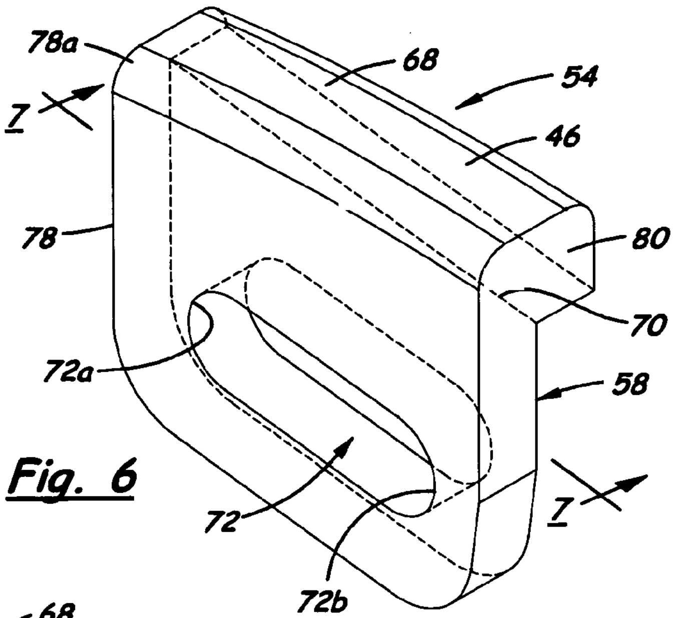

FIG. 6 is an enlarged isometric view of a movable adjustable component of the one embodiment of the mechanism shown in FIG. 5 which adjustable component is employed with the stationary component of the mechanism shown in FIG. 3 and accessible at the rear of the printhead carrier.

Figure 7:
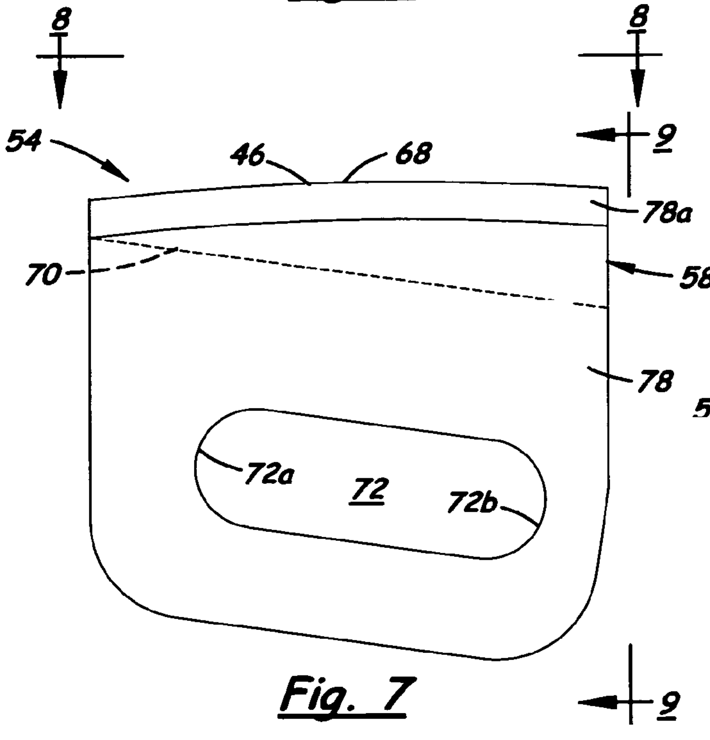

FIG. 7 is an enlarged front elevational view of the movable adjustable component as seen along line 7-7 of FIG. 6.

Figure 8:
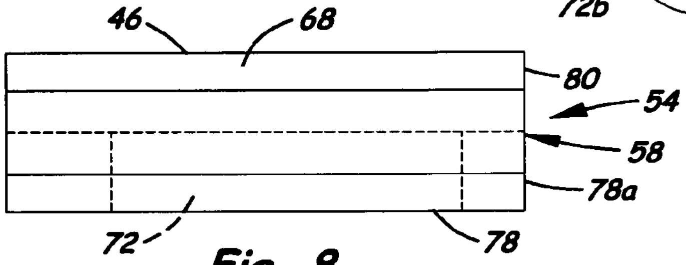

FIG. 8 is an enlarged top plan view of the movable adjustable component as seen along line 8-8 of FIG. 7.

Figure 9:
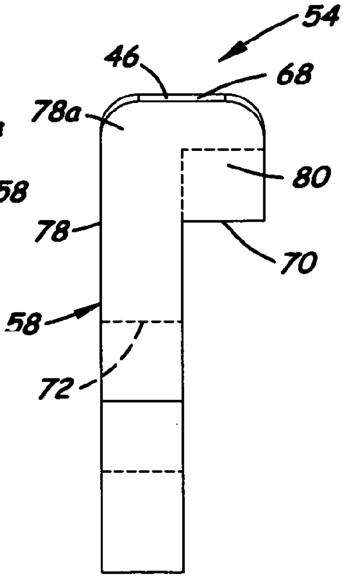

FIG. 9 is an enlarged end elevational view of the movable adjustable component as seen along line 8-8 of FIG. 7.

Figure 10:
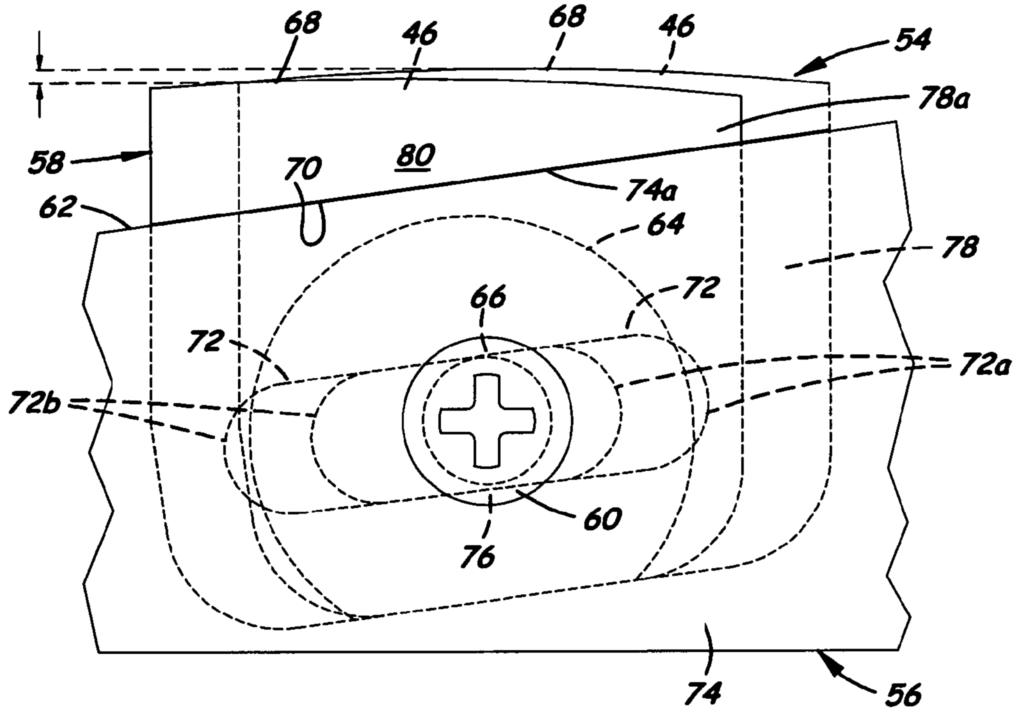

FIG. 10 is an enlarged rear elevational assembled view of the movable and stationary components of the one embodiment of FIG. 5 adjusted at two different positions.

Figure 11:
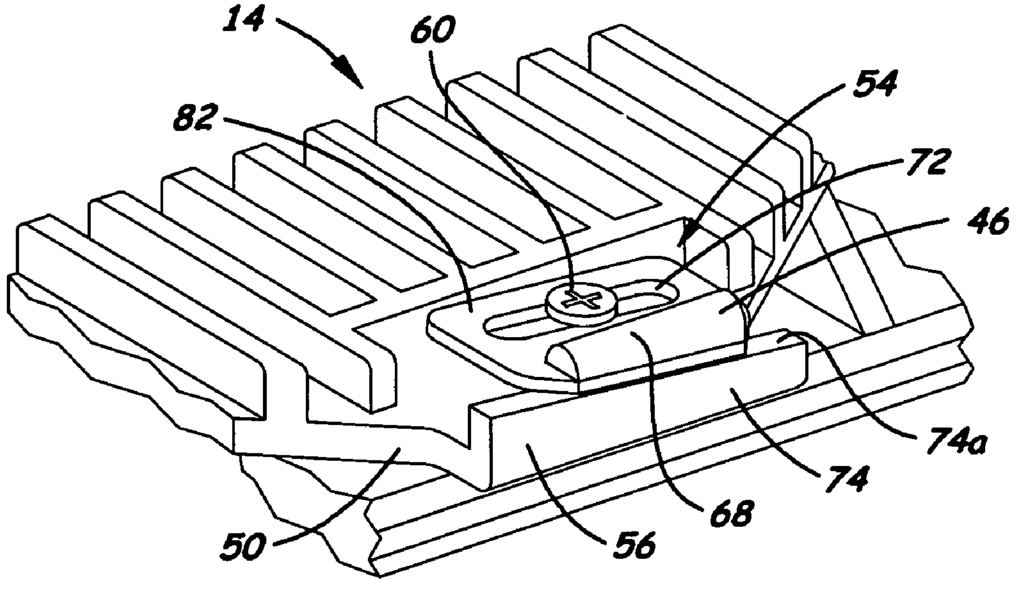

FIG. 11 is a rear perspective fragmentary view of the printhead carrier of FIG. 3, showing the other embodiment of the height-adjustable mechanism of the present invention.

Figure 12:
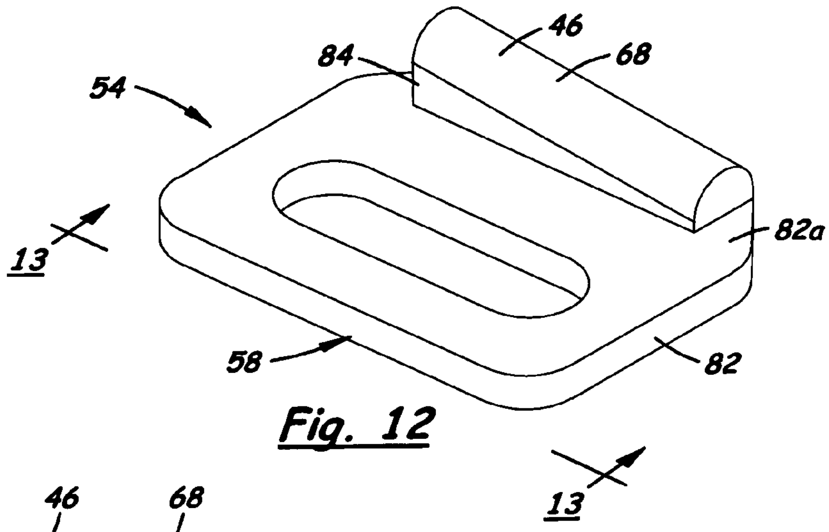

FIG. 12 is an enlarged isometric view of a movable adjustable component of the other embodiment of the mechanism shown in FIG. 11 which adjustable component is accessible at the top of the printhead carrier.

Figure 13:
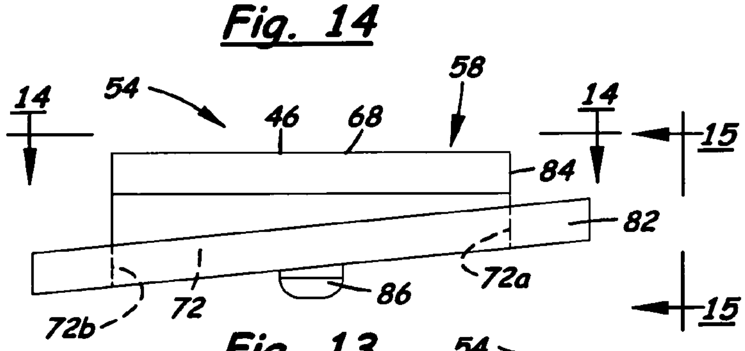

FIG. 13 is an enlarged front elevational view of the movable adjustable component as seen along line 13-13 of FIG. 12.

Figure 14:
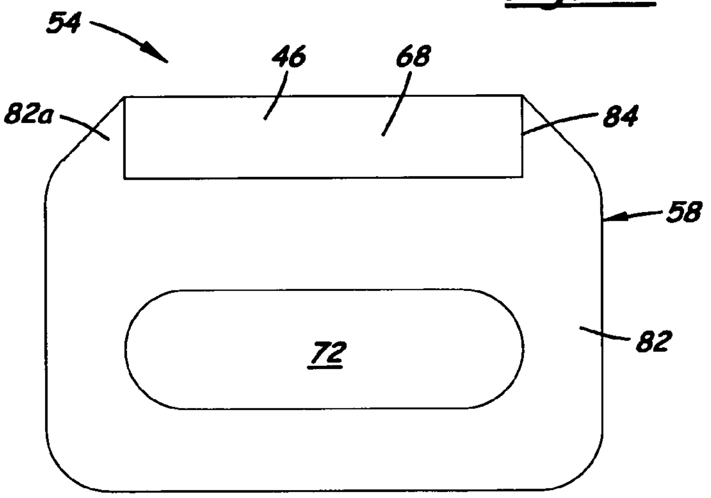

FIG. 14 is an enlarged top plan view of the movable adjustable component as seen along line 14-14 of FIG. 13.

Figure 15:
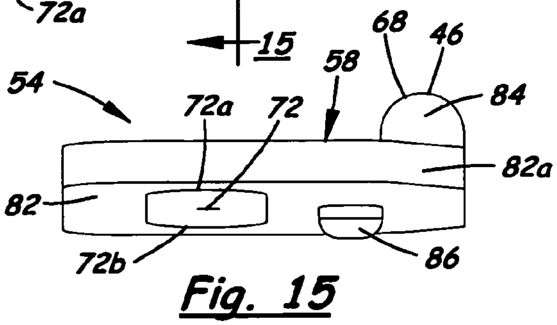

FIG. 15 is an enlarged end elevational view of the movable adjustable component as seen along line 15-15 of FIG. 13.

Figure 16:
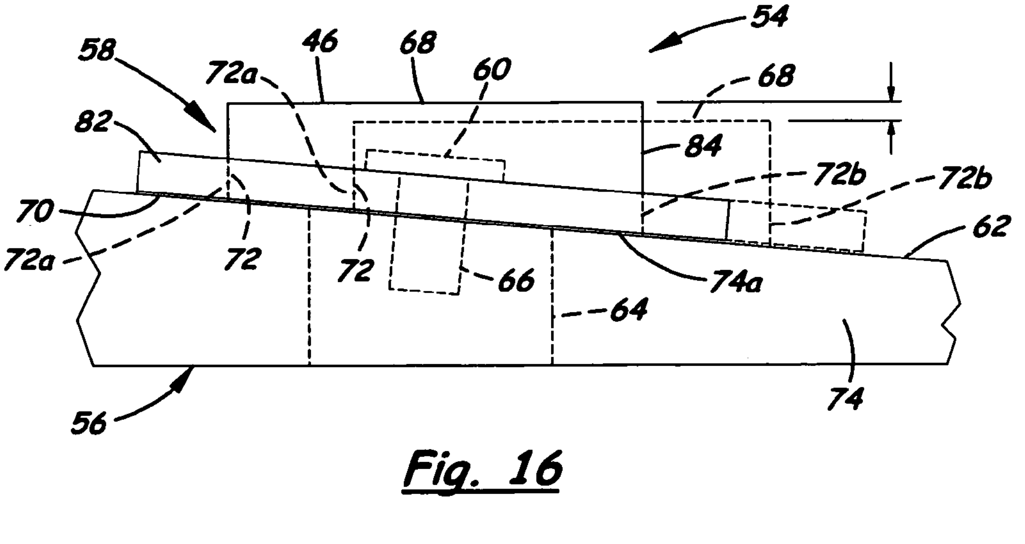

FIG. 16 is an enlarged rear elevational assembled view of the adjustable and stationary components of the other embodiment of FIG. 11 adjusted at two different positions.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIGS. 1 and 2, there is illustrated a portion of an inkjet printer in the form of a carrier assembly, generally designated 10. The carrier assembly 10 includes a carrier support frame 12 and a printhead carrier 14. The carrier support frame 12 is mounted stationary on the printer frame (not shown) and can be made of any suitable material, for example aluminum or steel. The frame 12 has opposite right and left end panels 16, 18 interconnected by a back panel 20. The carrier support frame 12 also has a pair of carrier guide members 22, 24. The first guide member 22 is in the form of a rail or rod, made of any suitable material, for example aluminum or steel, that extends between and mounts at its opposite ends to the opposite end panels 16, 18 of the carrier support frame 12. The second guide member 24 is in the form of a top portion of the back panel 20 which is bent forward through ninety degrees from the rest of the back panel 20 and engages the opposite end panels 16, 18. However, those skilled in the art will recognize that the second carrier guide member 24 may be in the form of a separate unit, such as rail or rod, similar to the first guide member 22, rather than be a portion of the back panel 20 of the carrier support frame 12. A print media path 26 passes under the carrier support frame 12 and through a print zone 28 also located thereunder. The first and second guide members 22, 24, as can be best seen in FIG. 2, are located upstream from the print zone 28, wherein the term "upstream" is used in relation to the print media feed direction 30.

Referring now to FIGS. 1-4, the printhead carrier 14 is supported and positioned on the carrier support frame 12 by the first and second carrier guide members 22, 24 for undergoing reciprocatory movement between the opposite ends 16, 18 of the frame 12. The printhead carrier 14 is reciprocated by a suitable translation mechanism (not shown) on the printer. As well known in the art, the translation mechanism may be a belt attached to the carrier 14 and a drive motor coupled to the belt to drive the belt and thereby translate the carrier 14 reciprocally or bi-directionally along an axis defined by the first guide member 22 and across the width of a sheet 32 of print media in the print zone 28. The operation of the motor and reciprocation of the printhead carrier 14 are under the control of a suitable microprocessor or controller (not shown) installed in the printer. As one skilled in the art will appreciate, any suitable controller and translation mechanism may be utilized in the printer.

The carrier 14 has one or more positions for receiving and holding one or more monochrome or color ink cartridges or tanks 36, as shown in dashed outline form, above one or more inkjet printheads 38, as also shown in dashed outline form, carried by the carrier 14 forwardly of and spaced below the first carrier guide member 22, as seen in FIG. 2. In view that ink cartridges or tanks and inkjet printheads are well known in the art and are of conventional design and not part of the present invention, they need not be shown nor described herein in order for gaining a complete and thorough understanding of the present invention. As the printhead carrier 14 undergoes reciprocating movement relative to the carrier frame 12 and across the print media path 26, it carries and scans the printheads 38 through the print zone 28. As the printheads 38 traverse the print zone 28 they eject drops of ink onto the sheet 32 of print media at predefined locations to form a printed image thereon that is expected to be a high-quality replica of image data inputted to the printheads 38 by the controller for printing. The achievement of a high-quality printed image is dependent, at least in part, on the proper alignment of the printhead carrier 14 relative to the carrier frame 12 to provide the desired gap 40 between the printheads 38 and the sheet 32 of print media.

Further, the printhead carrier 14 has a body 42 made of a suitable material, such as plastic, aluminum or steel. The carrier body 42 has primary and secondary bearings 44, 46 thereon. The carrier body 42 is aligned with and supported by the carrier frame 12 at the locations of its primary and secondary bearings 44, 46. At its primary and secondary bearings 44, 46, the carrier 14 slidably rides on and contacts respectively the first and second carrier guide members 22, 24. Furthermore, the primary and secondary bearings 44, 46 are formed at locations on the carrier body 42 that are preselected for properly aligning the printheads 38 relative to the sheet 32 of print media and also for enabling the carrier 12 to be translated bi-directionally along the carrier guide members 22, 24.

More particularly, there are two primary bearings 44 and one secondary bearing 46 on the carrier body 42 where it rests on and against the two guide members 22, 24. The two primary bearings 44 are spaced apart from each other and are formed on the carrier body 42 at its respective opposite ends 42*a*, 42*b*. Each primary bearing 44 is generally centrally located on the respective one end 42*a*, 42*b* and is integrally formed by a pair of adjacent bearing structures 44*a*, 44*b* defined in spaced apart relation to one another. The two bearing structures 44*a*, 44*b* of each primary bearing 44 overlie, straddle and engage similarly spaced apart portions 22*a*, 22*b* of an upper guiding surface 48 on the first guide member 22 so as to make slidable contact with substantially opposite sides of the upper guiding surface 48 as the carrier 14 is translated along the guide members 22, 24. The one secondary bearing 46 is generally peripherally located on a rear mid-portion 50 of the carrier body 42. It is aligned between the two primary bearings 44 but is laterally offset, both vertically and horizontally, from them and located above them. The secondary bearing 46 contacts and rides along the second guide member 24 which is constituted by the underside of the top portion 52 of the back panel 20 of the carrier frame 12. Thus, the primary bearings 44 on the opposite ends 42*a*, 42*b* of the printhead carrier body 42 slidably ride on the first guide member 22 in the form of an elongate rod or rail while the secondary bearing 46 rides on a second guide member 24 in the form of a back panel portion of the carrier frame 12 that supports the first guide member 22. As an alternative, the second guide member 24 could be provided in the form of an elongate rod or rail instead of using the top portion of the carrier frame 12. As another alternative, second guide member 24 is not spaced both horizontally and vertically from first guide member 22 and instead carrier body 42 is maintained so as to have only one degree of freedom.

The printhead carrier 14 is pivotal about the first guide member 22 and the center of mass of the carrier 14 is to the right of the first guide member 22, as shown in FIG. 2, so that the carrier 14 tends to pivot clockwise about the first guide member 22. This center of mass relationship presses the secondary bearing 46 upward against the underside of the top portion 52 of the back panel 20 of the carrier frame 14. Also, since the printheads 38 are held in a fixed relationship with the printhead carrier 14, any incremental vertical or angular movement of the printhead carrier 14 translates into an incremental vertical or angular movement of the printheads 38 relative to the sheet 32 of print media in the print zone 28. Thus, effecting a change in the angle between the printheads 38 and the sheet 32 of print media to properly position the printheads 38 at a predetermined placement relative to the path 26 of the sheet 32 of print media through the print zone 28 can readily be accomplished by changing the position of the printhead carrier 14 on the first and second carrier guide members 22, 24.

Referring now to FIGS. 5-16, in accordance with the present invention a height-adjustable mechanism 54 is provided in association with one of the bearings, namely the secondary bearing 46, and is continuously adjustable to effect a continuous increase (raising) or decrease (lowering) of the height of the secondary bearing 46 relative to the carrier body 42 to thereby set the printheads 38 at a proper angle relative to the sheet 32 of print media. A first embodiment of the height-adjustable mechanism 54 is shown in FIGS. 5-10 while a second embodiment of the mechanism 54 is shown in FIGS. 11-16.

Referring to both embodiments in FIGS. 5, 10, 11 and 16, the height-adjustable mechanism 54 includes a fixed or stationary portion or component 56, a movable or adjustable portion or component 58 and a fastener 60. The stationary component 56 is rigidly attached on the rear mid-portion 50 of the carrier body 42 and has a first inclined surface or ramp 62, and a boss 64 adjacent the first ramp 62 defining a fastener-receiving bore 66. The adjustable component 58, made of a suitable bearing material, has an upper bearing surface 68 constituting the secondary bearing 46 and a second inclined surface or ramp 70 spaced below the upper bearing surface 68 and complementary in shape to the first ramp 62 of the stationary component 56. Complementary in shape means that the second ramp 70 can overlie and rest upon the first ramp 62 so as to enable continuous sliding movement of the adjustable component 58 uphill or downhill relative to the stationary component 56, as shown in FIGS. 10 and 16, to correspondingly continuously increase or decrease the height of the horizontally-positioned upper bearing surface 68 (or secondary bearing 46) above the stationary component 56. Such change in the height of the secondary bearing 46 correspondingly changes the angular position of the carrier body 42 about the first guide member 22 in view that the lengths of the horizontal and vertical offsets of the secondary bearing 46 relative to the primary bearings 44 and thereby the angular position of the carrier body 42 and printheads 38 therewith change in one or the other of counterclockwise or clockwise directions about the first guide member 22 to set a desired angular relationship of the body 42 of the printhead carrier 14 to the first guide member 22 and thereby of the printheads 38 to the sheet 32 of print media. The adjustable component 58 further has a slot 72 spaced from the second ramp 70 and extending generally parallel thereto with opposing ends 72*a*, 72*b* defining upper and lower limits of the range of the continuous sliding movement of the adjustable component 58 relative to the stationary component 56. The fastener 60, which can be for example a conventional screw of suitable size, is insertable through the slot 72 of the adjustable component 58 and into the fastener-receiving bore 66 of the boss 64 of the stationary component 56 to releasably fasten, such as by tightening the complementary threads on the fastener 60 and in the bore 66, the adjustable component 58 to the stationary component 56 to thereby retain the upper bearing surface 68 of the adjustable component 58 at a desired height above the stationary component 56 and the body 42 at a desired angular position in the printer.

Specifically, in the first embodiment of FIGS. 5-10, the stationary component 56 further has a wall 74 with the first ramp 62 defined on an upper edge 74*a* thereof and a hole 76 define therethrough in alignment with the fastener-receiving bore 66 of the boss 64. The boss 64 is spaced from the wall 74. The adjustable component 58 includes a flat member 78 having ledge 80 protruding laterally from a top portion 78*a* of the flat member 78. The second ramp 70 is defined along a bottom surface of the ledge 80 and the upper bearing surface 68 is defined along a top of the ledge 80. The flat member 78 is adapted to fit between the boss 64 and the wall 74 of the stationary component 56. The slot 72 is defined through the flat member 78 in alignment between the hole 76 in the wall 74 and the fastener-receiving bore 66 of the boss 64 such that the fastener 60 is insertable through the hole 76 in the wall 74, the slot 72 in the flat member 78 and into the bore 66 in the boss 64. The ledge 80 of the flat member 78 overlies the upper edge 74*a* of the wall 74 such that the second ramp 70 overlies and rests on the first ramp 62.

Referring now to FIGS. 11-16, in the second embodiment the adjustable component 58 is a substantially flat plate 82 defining the second ramp 70 on a bottom of the flat plate 82 adapted to overlie and rest on the first ramp 62 of the stationary component 56. The flat plate 82 has a longitudinal rib 84 formed on a top of a marginal edge portion 82*a* of the flat plate 82. The rib 84 is wedge-shaped and defines the upper bearing surface 68. The slot 72 is defined through the flat plate 82 in alignment with the fastener-receiving bore 66 of the boss 64 of the stationary component 56 such that the fastener 60 is insertable through the slot 72 and into the bore 66 in the boss 64. The flat plate 82 of the adjustable component 58 has a guide dimple 86 formed on the bottom of the flat plate 82 adjacent to the marginal edge portion 82*a* thereof so as to assist in aligning the flat plate 82 of the adjustable component 58 upon the boss 64 and first ramp 62 of the stationary component 56.

The length and angle of the second ramp 70 could be modified to meet the requirements of the amount of adjustment that is desired. The first ramp 62 of the stationary component 56 could be in any plane direction so as to allow adjustment from the front, back, top, bottom, or either side of the carrier 14, depending on system requirements. Also, to improve the ease of adjustment on the manufacturing line, the adjustable component 58 can be modified to allow adjustment from any plane on the carrier body 42. The adjustment could be done by hand, or could be mostly automated if desired.

Automatic adjustment (with manual tightening) could also be implemented if desired. This could be achieved by having a feature on the carrier frame 12, or separate manufacturing assembly part, that would touch the adjustable component 58 and move its position. The carrier 14 would sense the printhead to paper path angle and move into the feature/assembly part (thus adjusting the angle) until the adjustable component was in the desired position. Then the assembler could tighten the fastener 60 and keep the feature secured in the correct location.

The foregoing description of several embodiments of the invention has been presented for purposes of illustration. It is not intended to be exhaustive or to limit the invention to the precise forms disclosed, and obviously many modifications and variations are possible in light of the above teaching. For example, in an alternative embodiment of the present invention, more than one of bearings 44, 46 are individually adjustable for aligning printheads 38 to a sheet of media. It is intended that the scope of the invention be defined by the claims appended hereto.

What is claimed is:

1. A printhead carrier in a printer, the printhead carrier comprising:

a body having spaced apart bearings by means of which said body is supported at a position in the printer adapted to position a printhead on said printhead carrier at a predetermined placement relative to a path of a sheet of print media through a print zone in the printer; and a height-adjustable mechanism associated with one of said bearings and being continuously adjustable to effect a continuous increase or decrease of the height of said one bearing relative to said body to thereby set the printhead at a proper angle relative to the sheet of print media;

wherein said height-adjustable mechanism includes a stationary portion rigidly attached on said body and having a first ramp, and an adjustable portion having a bearing surface constituting said one bearing and a second ramp spaced from said bearing surface and complementary in shape to said first ramp of said stationary portion such that said second ramp rests against said first ramp enabling continuous sliding movement of said adjustable portion uphill or downhill relative to said stationary portion to correspondingly continuously increase or decrease the height of said bearing surface relative to said stationary portion and thereby correspondingly change the angular position of said body in the printer, said adjustable portion further having a slot spaced from said second ramp and extending generally parallel thereto with opposing ends defining limits of the range of said continuous sliding movement of said adjustable portion relative to said stationary portion.

2. The carrier of claim 1 wherein said stationary portion further includes a boss adjacent said first ramp defining a fastener-receiving bore.

3. The carrier of claim 2 wherein said height-adjustable mechanism further includes a fastener insertable through said slot of said adjustable portion and into said fastener-receiving bore of said boss of said stationary portion to releasably fasten said adjustable portion to said stationary portion to thereby retain said bearing surface of said adjustable portion at a desired height relative to said stationary portion and said body at a desired angular position in the printer.

4. The carrier of claim 3 wherein said stationary portion further has a wall with said first ramp defined on an upper edge thereof and a hole defined therethrough in alignment with said fastener-receiving bore of said boss, said boss being spaced from said wall, said fastener being insertable through said hole in said wall and into said bore in said boss.

5. The carrier of claim 4 wherein said adjustable portion is a flat member having a ledge protruding laterally from a top portion of said flat member, said second ramp defined along a bottom of said ledge and said bearing surface of said adjustable portion defined along a top of said ledge, said flat member adapted to fit between said boss and said wall of said stationary portion, said slot defined through said flat member in alignment between said hole in said wall and said fastener-receiving bore of said boss such that said fastener is insertable through said hole in said wall, said slot in said flat member and into said bore in said boss, said ledge of said flat member overlying said upper edge of said wall such that said second ramp overlies and rests on said first ramp.

6. The carrier of claim 3 wherein said adjustable portion is a substantially flat plate including said second ramp on a bottom of said flat plate adapted to overlie and rest on said first ramp of said stationary portion, said flat plate having a longitudinal rib formed on a top of a marginal edge portion of said flat plate, said rib being wedge-shaped and defining said bearing surface of said adjustable portion, said slot defined through said flat plate in alignment with said fastener-receiving bore of said boss of said stationary portion such that said fastener is insertable through said slot and into said bore in said boss.

7. The carrier of claim 6 wherein said flat plate of said adjustable portion has a guide dimple formed on said bottom of said flat plate adjacent to said marginal edge portion thereof so as to assist in aligning said flat plate of said adjustable portion on said boss and first ramp of said stationary portion.

8. A printhead carrier assembly in a printer, the printhead carrier assembly comprising:

a carrier support frame having a first guide member and a second guide member spaced apart from said first guide member;

a printhead carrier having a body and primary and secondary bearings supporting said body on said first and second guide members so as to position a printhead on said printhead carrier at a predetermined placement relative to a path of a sheet of print media through a print zone in the printer; and a height-adjustable mechanism associated with said secondary bearing and being continuously adjustable to effect a continuous increase or decrease of the height of said secondary bearing above said body to thereby set the printhead at a proper angle relative to the sheet of print media;

wherein said height-adjustable mechanism includes a stationary component on said body of said printhead carrier being located adjacent to said second guide member, said stationary component having a first inclined surface thereon, and said height-adjustable mechanism also includes an adjustable component having an upper bearing surface constituting said secondary bearing and a second inclined surface thereon spaced below of said upper bearing surface and complementary in shape to said first inclined surface of said stationary component such that said second inclined surface overlies and rests upon said first inclined surface enabling continuous sliding movement of said adjustable component uphill or downhill relative to said stationary component to correspondingly continuously increase or decrease the height of said upper bearing surface above said stationary component and thereby correspondingly change the angular position of said body and the printhead therewith in one or the other of counterclockwise or clockwise directions about said first guide member, said adjustable component further having a slot spaced from said second inclined surface and extending generally parallel thereto with opposing ends defining limits of the range of said continuous sliding movement of said adjustable component relative to said stationary component.

9. The carrier assembly of claim 8 wherein said stationary component further includes a boss adjacent said first inclined surface defining a fastener-receiving bore.

10. The carrier assembly of claim 9 wherein said height-adjustable mechanism further includes a fastener insertable through said slot of said adjustable component into said fastener-receiving bore of said boss of said stationary component to releasably fasten said adjustable component to said stationary component to thereby retain said body at the desired angular relationship to said first guide member.

11. The carrier assembly of claim 10 wherein said stationary portion further has a wall with said first inclined surface defined on an upper edge thereof and a hole define therethrough in alignment with said fastener-receiving bore of said boss, said boss being spaced from said wall, said fastener being insertable through said hole in said wall and into said bore in said boss.

12. The carrier assembly of claim 11 wherein said adjustable component is a flat member having a ledge protruding laterally from a top portion of said flat member, said second inclined surface defined along a bottom of said ledge and said upper bearing surface defined along a top of said ledge, said flat member being adapted to fit between said boss and said wall of said stationary portion, said slot defined through said flat member in alignment between said hole in said wall and said fastener-receiving bore of said boss such that said fastener is insertable through said hole in said wall, said slot in said flat member and into said bore in said boss, said ledge of said flat member overlying said upper edge of said wall such that said second inclined surface overlies and rests on said first inclined surface.

13. The carrier assembly of claim 10 wherein said adjustable portion is a substantially flat plate including said second inclined surface on a bottom of said flat plate adapted to overlie and rest on said first inclined surface of said stationary component, said flat plate having a longitudinal rib formed on a top of a marginal edge portion of said flat plate, said rib being wedge-shaped and defining said upper bearing surface, said slot defined through said flat plate in alignment with said fastener-receiving bore of said boss of said stationary component such that said fastener is insertable through said slot and into said bore in said boss.

14. The carrier assembly of claim 13 wherein said plate of said adjustable component has a guide dimple formed on said bottom of said flat plate adjacent to said marginal edge portion thereof so as to assist in aligning said flat plate of said adjustable component on said boss and first inclined surface of said stationary component.

15. The carrier assembly of claim 8, wherein said second guide member is spaced apart and laterally offset from said first guide member, both horizontally and vertically.

* * * * *